UNITED STATES PATENT OFFICE.

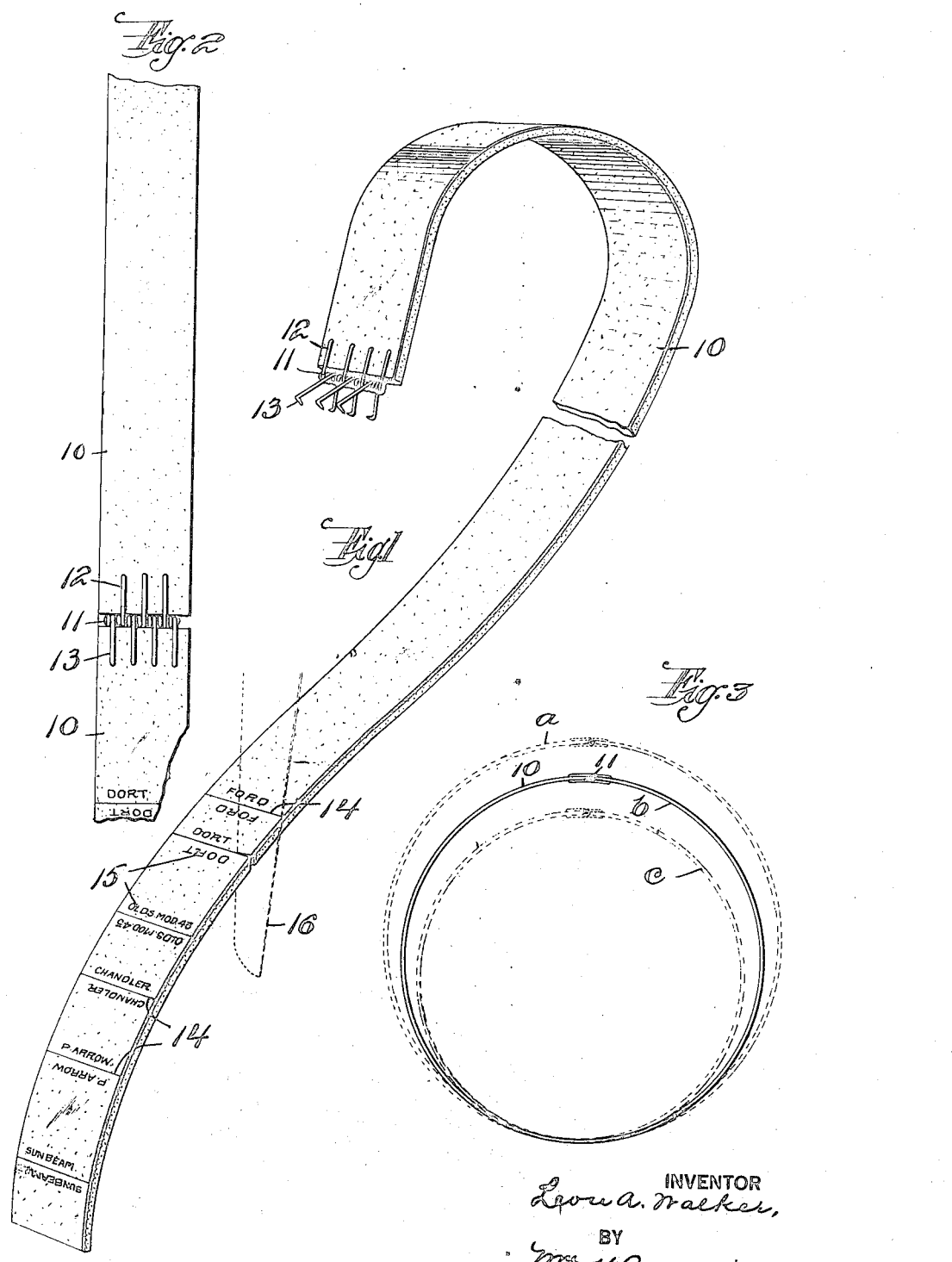

LEON A. WALKER, OF NEWARK, NEW JERSEY.

DRIVING BELT.

1,426,796.　　　　　Specification of Letters Patent.　　Patented Aug. 22, 1922.

Application filed October 26, 1921. Serial No. 510,516.

*To all whom it may concern:*

Be it known that I, LEON A. WALKER, a citizen of the United States, and a resident of Newark, county of Essex and State of New Jersey, have invented certain new and useful Improvements in Driving Belts, of which the following is a specification.

This invention relates to an improved driving belt which is adapted for different uses, but is primarily designed as a belt for use on the fans used in the cooling systems of automobiles, and is adapted to be kept in stock by dealers and to be made available for installation in different makes of cars by reason of indicia on the belt.

The invention is illustrated in the accompanying drawing, in which Figure 1 is a perspective view of a belt made according to my invention. Figure 2 is a face view with the ends of the belt joined together ready for use, and Figure 3 is a diagrammatic view indicating how the belt can be made in different sizes.

It is the custom at present to make belts, supplied by dealers, in different lengths adapted for use on various cars, which makes it necessary for the dealer to carry a considerable stock of these various lengths, or belting of material length is carried in stock which must be cut off at the proper point so that the belt will be just long enough to properly engage the faces of the pulleys over which it passes. This very often becomes a matter of difficulty and is rather tedious on account of the aptitude for making slightly inaccurate measurements, which makes the belt useless when its ends are joined together by reason of being slightly too long or slightly too short.

In my improved belt I provide one that requires the carrying in stock of a single line of belts for many different makes of cars, these belts being easily and quickly made of the proper length for the predetermined installation.

In the drawing 10 indicates my improved belt, and on one end I place a suitable belt fastener 11, the form shown comprising a belt fastener of the type now in commercial use, having the prongs 12 that are fastened in one end of the belt by squeezing it together, the prongs 13 projecting in the other direction being shown with their arms in their divergent positions ready to be clamped over the other end of the belt to make the belt complete.

At suitable points on the belt, and preferably on one or both faces thereof, I arrange indicia to indicate the required length of belt adapted for predetermined installations. In the form shown this indicia is in the form of lines 14, closely adjacent to which are the names of makes of automobiles, as at 15, to indicate that the belt, when cut off at this point, and when this end is then secured to the belt fastener, will be the proper length for that make of car. For instance, I show in the drawing, in dotted outline, a blade 16 cutting through the line marked "Dort." The belt, when thus cut off at this point, and then when its end is placed in the belt fastener and fastened thereby, will fit over the pulleys that drive the fan of the Dort car.

This description of the belt as applied to automobiles is simply for the purpose of making clear the use of the invention, as it will be evident that it can be utilized in many belts available for other purposes.

The belt, of course, at its extreme length, which we will assume is indicated by the dotted outline *a* in Figure 3, is of a size to fit the car requiring the longest length of belt, and the belt can thus be used without any cutting. At *b*, in full lines, I show a belt that has been severed and with its ends connected to show its use on a small size installation, and at *c*, in dotted outline, I show a still smaller size of belt, all these different sizes being possible from the same belt, all that needs to be done being to sever the belt at the indicated point to make it adapted for the predetermined use.

In order to make the use and functioning of the invention clear I have illustrated a belt fastener in conjunction with the belt, but it will be understood that any equivalent of this belt fastener can be employed, such as lacing or any other form of belt connector or fastener to join the two ends of the belt.

I claim:

1. A driving belt having indicia thereon to indicate where the belt is to be severed to adapt it for predetermined installations.

2. A driving belt having marks and machine identifying legends near one end to indicate where the belt is to be severed to adapt it for predetermined installations.

3. A driving belt having on one end a belt fastener, the belt having indicia thereon to indicate points for severing the belt to make the belt adapted for predetermined installations when its ends are secured by the fastener.

In testimony that I claim the foregoing, I have hereto set my hand, this 24th day of October, 1921.

LEON A. WALKER.